United States Patent
Yang

(10) Patent No.: US 9,572,357 B2
(45) Date of Patent: Feb. 21, 2017

(54) METHOD FOR PREPARING SWORD BEAN TEA

(71) Applicant: Myung Ok Yang, Busan-si (KR)

(72) Inventor: Myung Ok Yang, Busan-si (KR)

( * ) Notice: Subject to any disclaimer, the term of this patent is extended or adjusted under 35 U.S.C. 154(b) by 40 days.

(21) Appl. No.: 14/588,728

(22) Filed: Jan. 2, 2015

(65) Prior Publication Data

US 2015/0189897 A1    Jul. 9, 2015

(30) Foreign Application Priority Data

Jan. 8, 2014    (KR) .................. 10-2014-0002330

(51) Int. Cl.
*A23F 3/34*    (2006.01)
*A23F 3/12*    (2006.01)
*A23F 3/00*    (2006.01)
*A23F 3/06*    (2006.01)
*A23N 12/00*   (2006.01)

(52) U.S. Cl.
CPC ................. *A23F 3/34* (2013.01); *A23L 11/05* (2016.08); *A23F 3/00* (2013.01); *A23F 3/06* (2013.01); *A23F 3/12* (2013.01); *A23L 5/10* (2016.08); *A23L 5/13* (2016.08); *A23N 12/00* (2013.01)

(58) Field of Classification Search
CPC ............. A23F 3/00; A23F 3/06; A23F 3/08; A23F 3/12; A23F 3/14; A23F 3/34; A23F 2200/00; A23L 5/00; A23L 5/10; A23L 5/13; A23L 5/15; A23L 5/17; A23L 5/34; A23L 3/00; A23L 3/005; A23L 3/01; A23L 3/16; A23L 3/165; A23L 3/18; A23L 3/185; A23L 11/05; A23N 12/00; A23N 12/08; A23N 12/083; A23N 12/10; A23N 12/12; A23N 12/125
USPC ....... 426/237, 241, 242, 444, 520, 523, 486, 426/487, 488
See application file for complete search history.

(56) References Cited

U.S. PATENT DOCUMENTS 5,681,607 A * 10/1997 Maki .................. A23F 5/16
                                                  426/466
2009/0053383 A1* 2/2009 Endo .................. A23F 3/34
                                                  426/597

FOREIGN PATENT DOCUMENTS

| JP | 57181640 A | * 11/1982 |
| KR | 10-0324132 | 3/2001 |
| KR | 10-0759579 | 5/2006 |
| KR | 2011-0117376 | 10/2011 |
| KR | 10-1184909 | 6/2012 |

OTHER PUBLICATIONS

Sword Bean NPL, published Apr. 9, 2012, http://adage.com/article/news/japanese-swarm-sword-beans-cure/233981/.*
JP57181640A translation, Minamitani, published Nov. 9, 1981.*
English abstract of 10-0324132.
English abstract of 2011-0117376.
English abstract of 10-1184909.
English abstract of 10-0759579.

* cited by examiner

*Primary Examiner* — Drew Becker
*Assistant Examiner* — Bryan Kim
(74) *Attorney, Agent, or Firm* — Antonio Ha & U.S. Patent, LLC

(57) ABSTRACT

A method for preparing a sword bean tea is provided. In the method, a washed sword bean or a pod of the sword bean is cut into a predetermined size. The sword bean or the pod of the sword bean is dried at 30° C. to 40° C., for 24 hours to 72 hours. The sword bean or the pod of the sword be is roasted at 250° C. to 400° C. for 10 min to 30 min. The sword bean or the pod of the sword bean is left at 70° C. to 100° C. for 3 min to 10 min, and the sword bean or the pod of the sword bean is then stirred. The leaving and the stirring are alternately and repetitively performed five times. The sword bean or the pod of the sword bean is roasted at 180° C. to 200° C. for 3 min to 5 min.

1 Claim, No Drawings

METHOD FOR PREPARING SWORD BEAN TEA

CROSS-REFERENCE TO RELATED APPLICATIONS

This patent application claims priority under 35 USC. §119 to Korean Patent Application No. 10-2014-0002330, filed on Jan. 8, 2014 in the Korean Intellectual Property Office, the disclosure of which is incorporated by reference herein in its entirety.

TECHNICAL FIELD

Embodiments of the inventive concept relate to methods for preparing tea using beans, and more specifically, to methods for preparing tea using sword beans by processing the sword beans at a predetermined temperature for a predetermined time.

DISCUSSION OF RELATED ART

Sword bean is an annual vine legume that belongs to the genus Canavalia, and as its name indicates, it is one of the largest legume genera, and its size reaches a length of 20 to 30 cm. Dried sword beans contain a variety of vitamins, minerals, and other nutrients such as protein, flit, carbohydrate, fiber, ash calcium, magnesium copper, zinc, and manganese. In particular, sword bean is richer in vitamins A and B and vitamin B-complex than its other legume siblings.

Besides, it is known to be highly effective in treating vomiting, constipation obesity, stomachache, sinusitis, skin diseases, and other various inflammatory diseases. A sword bean extract, Concanavaline A, has been reported to have strong anti-cancer and antitoxic properties.

A few prior patent documents deal with such efficacy of sword bean, examples of which include Korean Patent Nos. 10-0324132, 10-1184909, and 10-0759579 and Korean Patent Application Publication No. 10-2011-0117376. Sword bean has been traditionally used as a vegetable but is recently expanding to its new fields of application, such as in the beverage or medical industry.

However, the characteristic raw smell of sword bean is still a challenge that leaves customers away from the sword bean products. Further, sword bean is, for its use in teas, not a popular choice due to its low extraction yield.

SUMMARY

According to an embodiment of the inventive concept, there is provided a method for preparing a sword bean tea, comprising cutting a washed sword bean or a pod of the sword bean into a predetermined size, drying the sword bean or the pod of the sword bean at 30° C. to 40° C. for 24 hours to 72 hours, roasting the sword bean or the pod of the sword bean at 250° C. to 400° C. for 10 min to 30 min, leaving the sword bean or the pod of the sword can at 70° C. to 100° C. for 3 min to 10 min and then stirring the sword bean or the pod of the sword bean, wherein the leaving and the stirring are alternately and repetitively performed five times, and roasting the sword bean or the pod of the sword bean at 180° C. to 200° C. for 3 min to 5 min.

According to an embodiment of the inventive concept, there is provided a sword bean tea prepared by the above method.

According to an embodiment of the inventive concept, there is provided a tea bag containing the sword bean tea. The tea bag is formed of a cotton cloth or a non-woven cloth.

DETAILED DESCRIPTION OF EMBODIMENTS

Hereinafter, exemplary embodiments of the inventive concept will be described in detail with reference to the accompanying drawings. The inventive concept, however, ma be modified in various different ways, and should not be construed as limited to the embodiments set forth herein.

According to an embodiment of the inventive concept, a method for preparing a sword bean tea includes the steps of (1) cutting washed sword beans or pods of the sword beans into a predetermined size; (2) drying the sword beans or the pods at about 30° C. to about 40° C., for about 24 hours to about 72 hours; (3) roasting the sword beans or the pods at about 250° C. to about 400° C. for about 10 min to about 30 min; (4) leak mg the sword beans or the pods at about 70° C. to about 100° C. about 3 min to about 10 min and then stirring the sword beans or the pods, wherein the leaving and the stirring are alternately and repetitively performed five times; and (5) roasting the sword beans or the pods at about 150° C. to about 200° C. for about 3 min to about 5 min. Step (3) is referred to as a first roasting step, and step (4) is referred to as a steaming step. Step (5) is referred to as a second roasting step.

By the method, the raw smell of sword beans may be removed, with the savory taste Reinforced. Further, the instant method may lead to an increased extraction yield.

According to an embodiment of the inventive concept, the whole sword beans or pods may be put in use. Use of unshelled pods, rather than bean seeds only, may result in a higher preference. For example, harvested sword beans may be classified depending on whether they have fully ripened. For fully ripe sword beans, only the pods may be put in use while, for immature sword beans, the whole sword beans, including both bean seeds and pods, may be used. In step (1), the predetermined size may be, e.g., about 1 mm to about 10 mm or less. Or, the whole sword beans or the pods may be crushed into an even less grain size. For example, the whole sword beans or the pods may be crushed into an average grain size of about 1 μm to about 100 μm by a pulverizer, such as, e.g., a hammer mill, a ball mill, a roller mill, or an air-flow mill.

In step (2), the sword beans or the pods may be dried at about 30° C. to about 40° C. for about 24 hours to about 72 hours. Accordingly, the resultant sword bean tea may show a better color, taste, and flavor. According to an embodiment of the inventive concept, the drying may be performed at about 35° C. to about 36° C. for about two hours depending on the amount of water in the whole beans or the pods.

In step (3), the dried sword beans or the pods may be primarily roasted at about 250° C. to about 400° C. for about 10 min to about 30 min (first roasting step). The first roasting step may lead to removal of the raw smell of sword bean, along with an enforced savory taste. The temperature of the first roasting step (which is simply referred to herein as "first roasting temperature") being lower than 250° C. may cause incomplete removal of raw smell, while the temperature being more than 400° C. may create a bitter taste.

In step (4), the roasted sword beans or the pods are left in a temperature atmosphere of about 70° C., to about 100° C., for about 3 minutes to about 10 minutes and are then stirred. Such leaving and stirring are alternately and repetitively performed about five times to about fifteen times. Leaving the roasted sword beans or the pods in the temperature atmosphere may further remove the raw smell while further increasing the savory taste. Further, the leaving the roasted sword beans or the pods in the temperature atmosphere may increase the extraction yield of the resultant sword bean tea. According to an embodiment of the inventive concept, in step (4), the process of leaving the sword beans or the pods in a temperature atmosphere of about 90° C., for about five minutes and then stirring the sword bean or the pod may be conducted about ten times.

In step (5), the sword beans or the pods may be secondarily roasted at about 180° C. to about 200° C. for about three min to about five min. Accordingly, the resultant sword bean tea may be left with a uniform taste and an increased extraction yield. In a specific example, step (5) may be performed at about 200° C. for about three min.

For a better taste or more bioactive extracts, about 0.5 g to about 1 g of the sword bean tea as prepared by the above method may be left to steep for about 1 min to about 5 min in about 50 ml to about 100 ml of hot water whose temperature is about 70° C. to about 100° C. The sword bean tea prepared by the above method, even with a small amount, may easily steep in water.

According to an embodiment of the inventive concept, the sword bean tea may be contained in a tea bag. For example, the sword bean tea prepared by the method may be packed in a tea bag by a tea bag packing machine. The tea bag may be formed of a cotton or non-woven cloth with pores that are sized to allow for easy steep while preventing the sword bean tea components from exiting to the outside.

Hereinafter, embodiments of the inventive concept are described, but it should be appreciated that the inventive concept is not limited thereto.

Embodiment 1

Preparation of Sword Bean Tea

Sword beans grown and harvested by an eco-friendly farming process were classified into a fully ripe type and an immature type. For the fully ripe type of sword beans, the bean seeds were removed from the pods, and only the pods were washed under clean running water. For the immature type of sword beans, the whole pods (i.e., unshelled pods) were washed. The washed pods were cut to a predetermined size by, e.g., a straw cutter, and were then dried at about 36° C. for about two days in a drier.

The dried pods were stirred and roasted for about 20 min in an iron pot, which had been pre-heated at about 250° C. Thereafter, the iron pot was decreased in temperature to about 90° C. and was left for about 5 min while covered with a lid. Then, the iron pot was opened to stir the pods once, and the iron pod was then closed back up with the lid. Such leaving and stirring were repeated ten times. After the process, the pods were roasted for about 3 min at about 200° C., thus resulting in a sword bean tea.

Embodiment 2 and Comparison Examples 1 and 2

Preparation of Sword Bean Tea at Different First Roasting Temperatures

The same processes as in Embodiment 1 except that different temperatures, 400° C., 100° C., and 500° C. were put to use in the first roasting step were alternately and repeatedly conducted at the different first roasting temperatures (400° C. for Embodiment 2, 100° C., for Comparison Example 1, and 500° C. for Comparison Example 2) to prepare a sword bean tea.

Comparison Example 3

Preparation of Sword Bean Tea without Steps 4 and 5

The same process as in Embodiment 1 except excluding steps 4 and 5 from Embodiment 1 was conducted to prepare a sword bean tea.

Comparison Example 4

Preparation of Sword Bean Tea without Step 5

The same process as in Embodiment 1 except excluding step 5 from Embodiment 1 was conducted to prepare a sword bean tea.

Experimental Example 1

Preference Evaluation Depending on First Roasting Temperatures

The following test was conducted on the sword bean teas respectively prepared by Embodiments 1 and 2 and Comparison Examples 1 and 2 to observe differences in preference of the sword bean teas according to the first roasting temperatures.

The sword bean teas, each 2 g, as prepared by Embodiments 1 and 2 and Comparison Examples 1 and 2 were left to steep in 90 g of water for about 1 min. The resultant tea beverages were served to 30 testees who include 15 males and 15 females in their twenties to thirties, and they were asked to sip and evaluate their preference.

Results are shown in Table 1 below:

TABLE 1

|  | Embodiment 1 | Embodiment 2 | Comparison Example 1 | Comparison Example 2 |
| --- | --- | --- | --- | --- |
| First roasting temperature | 250 | 400 | 100 | 500 |
| Preference | 4.51 | 4.68 | 3.89 | 4.03 |

* 5: very high, 4: high, 3: average 2: low, 1: very low

As evident from Table 1 above, the first roasting step, when conducted at 250° C. or 400° C., led to high preference values, as compared with when the first roasting step was done at 100° C. or 500° C. In particular, the prepared sword bean tea was left with a raw smell at the first roasting temperature of 100° C. and a bitter taste at the first roasting temperature of 500° C.

As such, a higher preference may be obtained when sword beans are roasted in a temperature range from about 250° C. to about 400° C.

Experimental Example 2

Preference Evaluation Depending on Whether Steps 4 and 5 are Conducted

Substantially the same test as in Experimental Example 1 was been conducted on the sword bean teas respectively prepared in Embodiment 1 and Comparison Examples 3 and 4 to observe differences in preference of the sword bean teas depending on whether steps 4 and 5 are conducted.

Results are shown in Table 2 below:

TABLE 2

|  | Embodiment 1 | Comparison Example 3 | Comparison Example 4 |
|---|---|---|---|
| step 4 | Done | not done | done |
| step 5 | Done | not done | not done |
| Preference | 4.51 | 2.58 | 3.20 |

As evident from Table 2, high preference values were obtained for the sword bean teas that had undergone steps 4 and 5, while significantly low preference values were led from Comparison Example 3 without steps 4 and 5 and Comparison Example 4 without step 5. In particular, the sword bean teas prepared as per Comparison Examples 3 and 4 gave little savory taste, even alongside a bit of raw smell. Accordingly, the preference for sword bean tea may be significantly increased by conducting the steaming step (step 4) and the second roasting step (step 5) after the first roasting step (step 3).

Experimental Example 3

Analysis of Extraction Yield

Extraction yields were analyzed for the sword bean teas respectively prepared as to Embodiment 1 and Comparison Examples 3 and 4. The sword bean tea was extracted in substantially the same way as in Experimental Example 1, and comparison was made as to the content of solids in the sword bean tea between before and after extraction. Results are shown in Table 3 below:

TABLE 3

|  | Embodiment 1 | Comparison Example 3 | Comparison Example 4 |
|---|---|---|---|
| Extraction Yield (%) | 2.87 | 0.85 | 0.14 |

As evident from Table 3 above, a high extraction yield was obtained for the sword bean tea that had undergone steps 4 and 5, while a low extraction yield resulted from Comparison Example 3 without steps 4 and 5 and Comparison Example 4 without step 5. From the above results, the extraction yield may be highly influenced by performing steps 4 and 5 on the sword beans or the pods.

As such, sword bean tea without unpleasant smell and with a high extraction yield may be prepared by the method according to embodiments of the inventive concept.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed:

1. A method for preparing a sword bean tea, the method comprising:
    cutting a washed sword bean or a pod of the sword bean into a predetermined size;
    drying the sword bean or the pod of the sword bean at 30° C. to 40° C. for 24 hours to 72 hours;
    roasting the sword bean or the pod of the sword bean at 250° C. to 400° C. for 10 min to 30 min;
    leaving the sword bean or the pod of the sword bean in a temperature atmosphere of 70° C. to 100° C. for 3 min to 10 min and then stirring the sword bean or the pod of the sword bean, wherein the leaving and the stirring are alternately and repetitively performed five times; and
    roasting the sword bean or the pod of the sword bean at 180° C. to 200° C. for 3 min to 5 min.

* * * * *